United States Patent [19]

Meagher

[11] Patent Number: 5,044,057
[45] Date of Patent: Sep. 3, 1991

[54] APPARATUS FOR MAKING BLASTING MATS

[76] Inventor: Robert Meagher, P.O. Box 293, Carrying Place, Ontario, Canada, K0K 1L0

[21] Appl. No.: 562,819

[22] Filed: Aug. 6, 1990

[51] Int. Cl.⁵ .............................................. B23P 19/04
[52] U.S. Cl. ....................................... 29/241; 29/267; 29/235
[58] Field of Search ................. 29/765, 728, 241, 267, 29/281.5, 235, 433

[56] References Cited

U.S. PATENT DOCUMENTS

| Re. 27,577 | 2/1973 | Rawlings et al. | 29/433 |
| 1,306,337 | 6/1919 | Hayden | 29/241 |
| 1,610,633 | 12/1926 | Swanson | 29/241 |
| 4,625,394 | 12/1986 | Kemnitz et al. | 29/241 |
| 4,682,411 | 7/1987 | Tomes, Jr. | 29/241 |

*Primary Examiner*—P. W. Echols
*Assistant Examiner*—David P. Bryant
*Attorney, Agent, or Firm*—Richard J. Hicks

[57] ABSTRACT

An apparatus and method for fabricating heavy duty blasting mats. A plurality of parallel spaced curved steel rods are clamped at their lower ends in a frame so that reclaimed automobile tire sections can be threaded in a prearranged pattern onto the free upper ends thereof. When the rods are fully loaded, the upper ends of the rods are clamped in an upper frame, and the lower ends are released. A hydraulically operated rake is actuated to push the assembled tire sections off the lower ends of the rods and onto steel cables flexibly and releasably coupled thereto.

5 Claims, 4 Drawing Sheets

APPARATUS FOR MAKING BLASTING MATS

FIELD OF INVENTION

This invention relates to a method and apparatus for making blasting mats.

BACKGROUND OF INVENTION

Heavy duty mats fabricated from reclaimed automobile tire sections and steel ropes have been used for many years to cover rock blasting sites during the blasting process in order to reduce the risk of flying debris and the like. Such mats are very heavy and can be in sizes up to about 15 feet wide and 18 feet long. The larger sizes include many rows of old tire segments and the closer the segments are packed onto the steel rope the more effective the blasting mat will be. Traditionally such mats have been assembled manually. This is not only labour intensive, and hence expensive, but it is also extremely heavy and dirty work. Productivity per man is relatively low, and labour turnover is high.

There is a need, therefore, for a machine which will automatically build up the tire segments on the steel cables and compress the assembled sections to form the heavy blasting mat. Heretofore no such machine appears to have been developed.

OBJECT OF INVENTION

It is, therefore, an object of the present invention to provide a machine for fabricating blasting mats.

It is another object of the invention to provide a method for fabricating blasting mats.

BRIEF STATEMENT OF INVENTION

Thus, by one aspect of this invention there is provided an apparatus for assembling a blasting mat, comprising:

a) a plurality of accurately curved longitudinally extending rod members arranged in spaced parallel relationship to each other, each having an upper and a lower end.

b) first frame support means arranged adjacent the lower ends of said rods;

c) first releasable clamping means mounted on said first support means to alternately grip and release said lower ends of said rods;

d) second frame support means arranged adjacent the upper ends of said rods;

e) second releasable clamping means mounted on said second support means to alternately release and grip said upper ends of said rods; said first and second releasable clamping means being arranged such that at least one end of said rods is always clamped;

f) third frame support means adjacent said first frame support means;

g) lever means pivottally mounted on said third support means;

h) means to move said lever means between a first and a second operating position; and i) rake means accurately moveable between adjacent pairs of said curved rod members and mounted at one end of said level means.

By another aspect of the invention there is provided a method for assembling a blasting mat comprising:

a) providing a plurality of longitudinal curved accurate rods in spaced parallel relationship, each with an upper and a lower end;

b) clamping said lower ends in a first rigid frame;

c) threading tire segments, having formed holes therein, onto the free ends of adjacent pairs of rods, in a predetermined sequence of pairs;

d) clamping said upper ends in a second rigid frame and releasing said lower ends from said first rigid frame;

e) forcing said tire segments down said rods and onto steel cables releasably secured to said lower ends.

DETAILED DESCRIPTION OF PREFERRED EMBODIMENT

Figure 1:
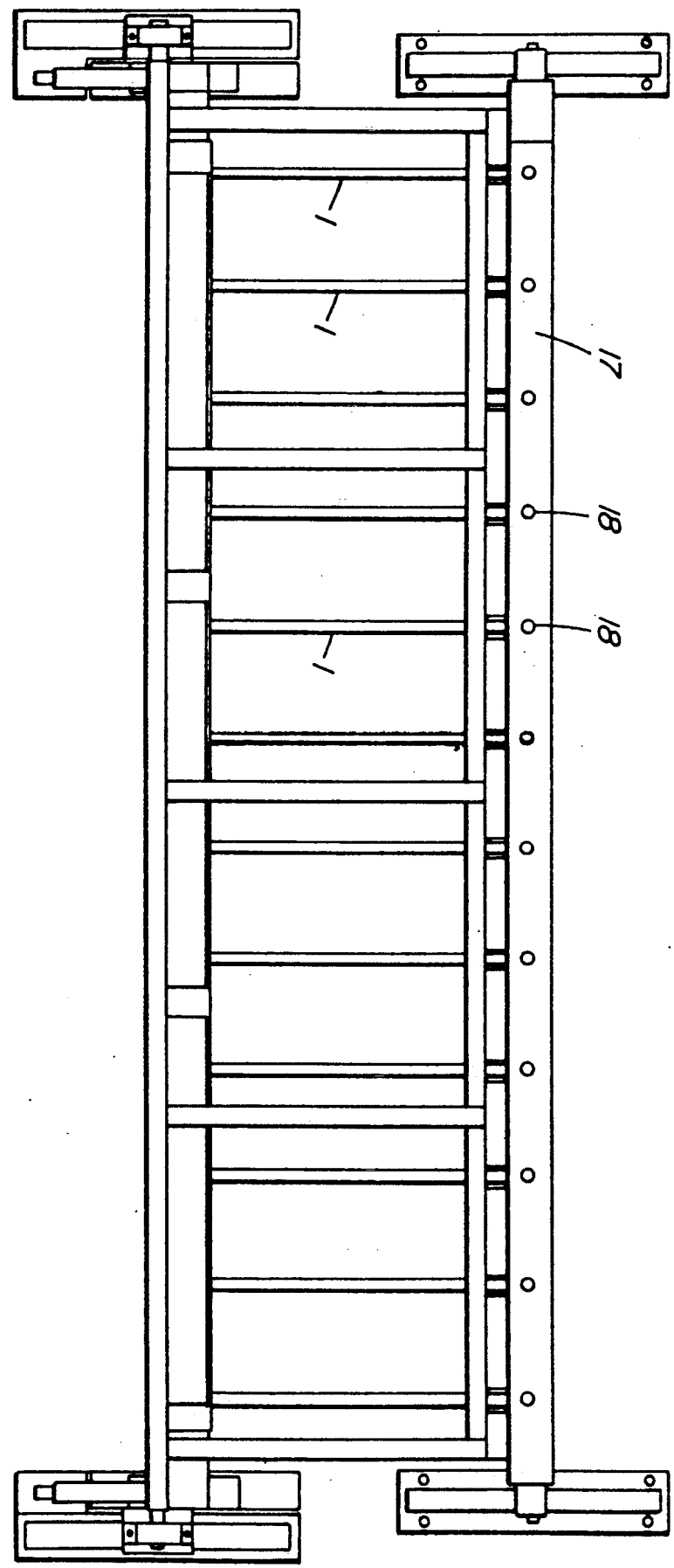
FIG. 1 is a plan view of an apparatus of the present invention.
Figure 2:
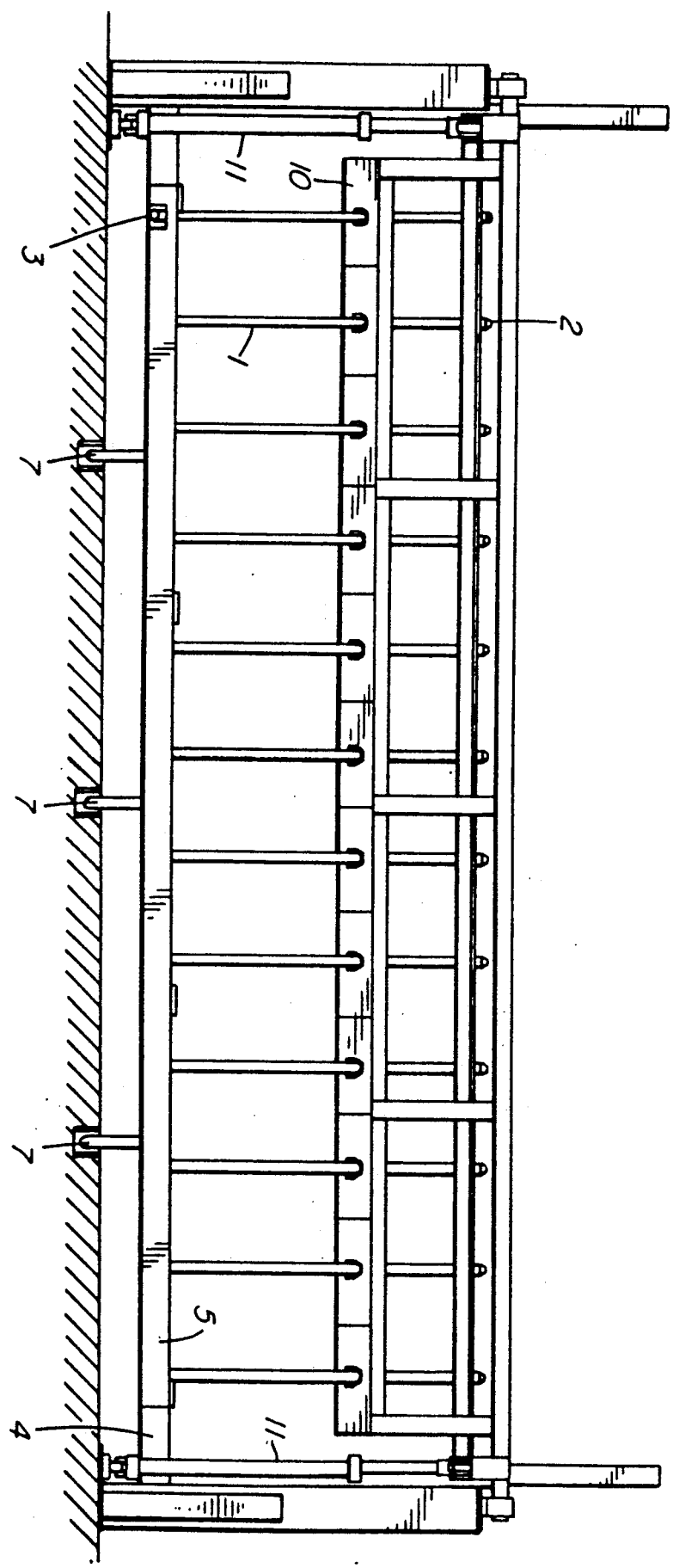
FIG. 2 is a front view of the embodiment of FIG. 1.
Figure 3:
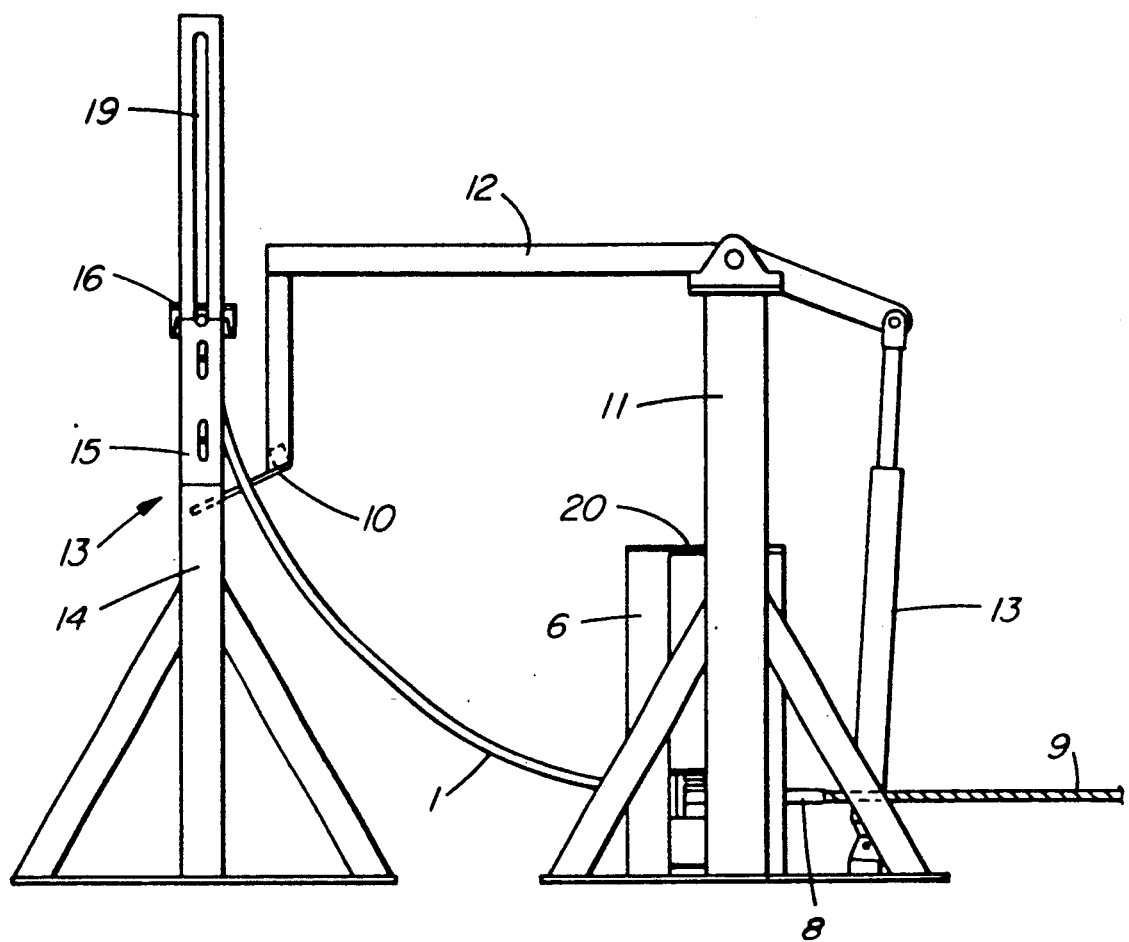
FIG. 3 is a side view of the embodiment of FIG. 1.

In the apparatus of this invention there are provided a plurality of curved rigid steel rods 1, about 1" in diameter and arranged in spaced parallel longitudinal relationship to each other as shown in plan view in FIG. 1 and in front view in FIG. 2. Each rod has an upper end 2 (FIG. 2) which is free when in the "load" position and clamped when in the "unload" position as described in more detail hereinafter. The lower ends 3 of rods 1 are clamped when in the load position and free when in the unload position. The rods 1 are held in the "load position" at their lower ends in a heavy lower clamp comprising an open channel frame member 4 having a slide bar 5 hydraulically rammed therealong which locks the lower ends 3 in position. The lower clamp is supported on each side by a support stand 6 (FIG. 3) and a series of floor inserts 7 spaced therealong. Extending longitudinally and horizontally from the lower ends 3 of the rods 1, and coupled thereto by means of a flexible coupling 8 which generally comprises a short length of an open mesh plaited cable, the diameter of which expands in compression and decreases in tension, there are provided long steel cables 9 onto which the 120° tire segments 41 which are provided with two pre-punched holes 42 which form the blasting mat are eventually to be threaded. The cables 9 may be up to about 50 feet in length. The free ends of cables 9 may be clamped together with a lifting eye (not shown) or otherwise secured as required for lifting the finished mat.

Figure 4:
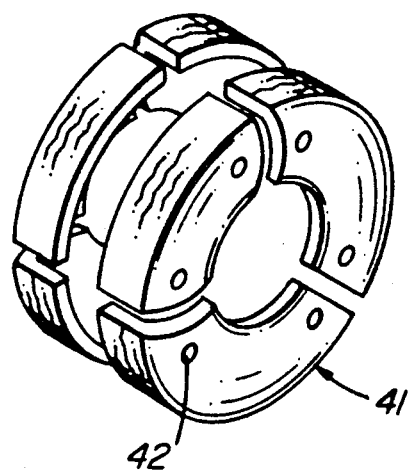
FIG. 4 is an isometric view of a tire showing the method of cutting for use in the present invention.
Figure 5:
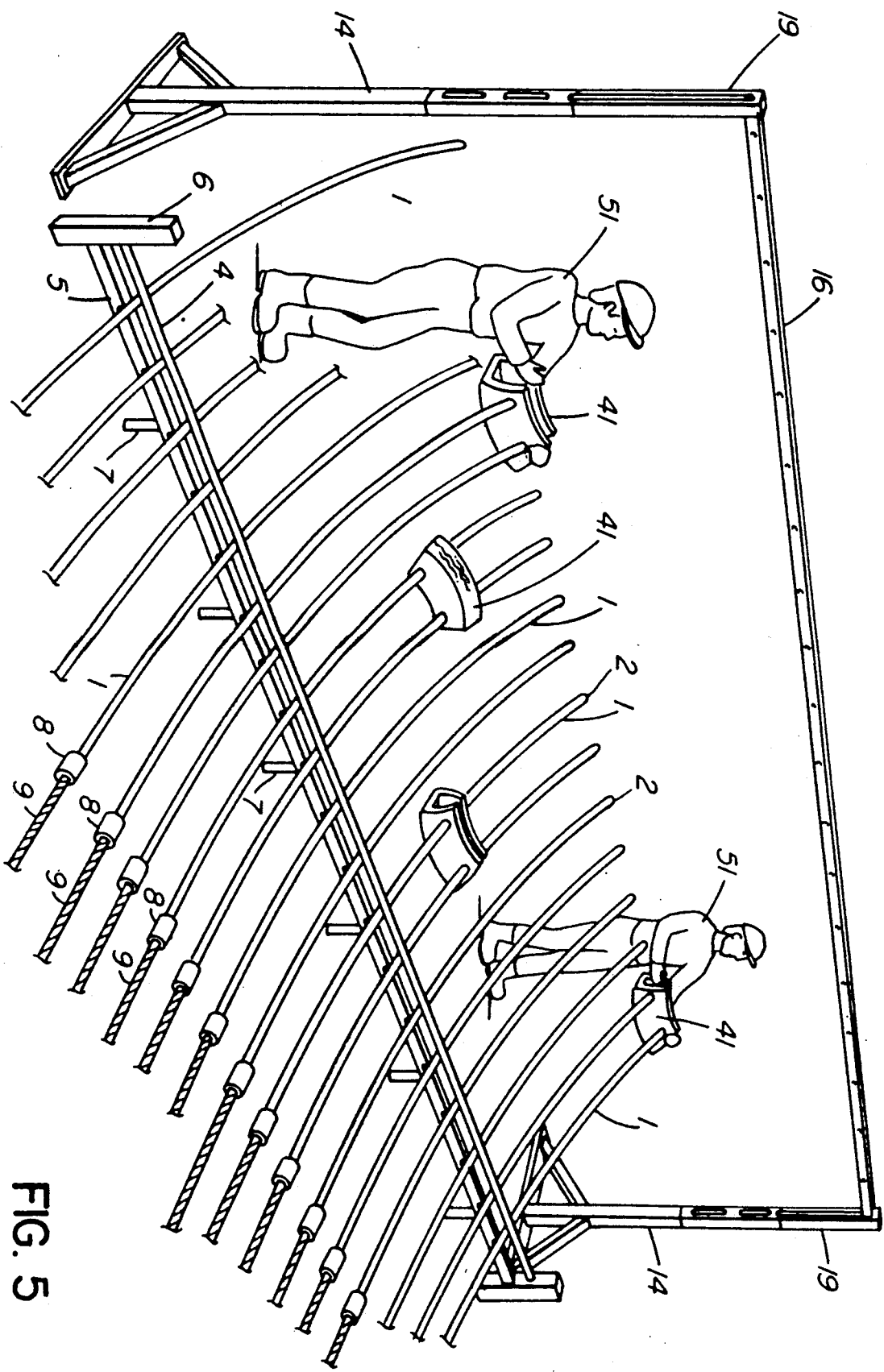
FIG. 5 is an isometric view of the apparatus of FIG. 1 showing tires being loaded, with the rake omitted for clarity.

In the load position the operators 51 grease the upper ends 2 of the rods with a rubber lubricant and thread 120° segments of tires which have been slit in two (as shown in FIG. 4) and of which is provided with a pre-drilled hole 42 at each end, over adjacent pairs of rods 1 in a predetermined pattern to ensure that the finished mat is securely locked together. For example, in the first row of segments to be placed, segments might be placed over rod numbers 1,2 then 3,4; 5,6; and so on. In row 2 segments might be placed over rod numbers 2,3; 4,5; 6,7 and so on. In row 3 segments might be placed over rod numbers 1,2; 2,3; 3,4; 4,5; 5,6 and so on across the entire width of the frame which may have up to about 30 rods. One loading pattern is shown schematically in FIG. 5. When some 10-15 rows have been loaded on the rods and they are substantially full, a hydraulically actuated rake plate 10, pivotally mounted on frames 11 at the end of arm 12 is lowered over the free ends of rods 1 to assume the position shown in FIGS. 2 and 3. It will be appreciated that in FIG. 3 only one rod 1 is actually illustrated in the interests of clarity. In fact a plurality of rods 1 extend across the entire frame at intervals of about 1 foot. When the rake plate 10 is in position on rods 1, the upper ends 2 of rods 1 are clamped by an upper clamp 13 which comprises an upper clamp support frame 14, a pair of upper clamp rest plates 15 which support a transverse channel member 16 in which a slider bar 17 slides relative to channel 16. Channel 16 and slider bar 17 are provided with a series of holes 18 in which the ends 2 of the rods 1 fit when the channel 16 and bar 17 are lowered down slide 19 in frames 14. When channel 16 and bar 17 engage the ends 2, bar 17 is moved laterally to firmly grip ends 2. The raising and lowering of the channel 16 and bar 17 is effected by a hydraulic cylinder (not shown) or by a conventional electric drive system. Similarly the relative movement of channel 16 and bar 17 can be effected hydraulically or electrically. With ends 2 firmly held the cylinder locking lower channel 4 and bar 5 in engagement with the lower ends 3 or rods 1 is actuated to release the lower ends. The lower channel 4 and bar 5 can then be raised hydraulically to clear the work area to a position adjacent plate 20. Cylinder 13 is then actuated to drive rake plate 10 arcuately down rods 1 and thus push the tire segments off rods 1 over flexible connector 8 and onto steel cables 9. When rods 1 are cleared of their load of tire segments, cylinder 13 is reversed to retract rake plate 10. The lower clamp 4,5 is re-engaged and upper clamp 13 is disengaged and withdrawn up slide 19, thus freeing ends 2 and allowing complete withdrawal of rake plate 10. The cycle can then be repeated. When the cables 8 are fully loaded and the segments pressed tight, they are released from flexible couplings 8 and the free ends are secured by clamping and/or welding and the finished blasting mat is then hauled away. New cables 9 are loaded onto couplings 8 and the production cycle repeated.

I claim:

1. An apparatus for assembling a blasting mat, comprising:

a) a plurality of arcuately curved longitudinally extending rod members arranged in spaced parallel relationship to each other, each having an upper vertically disposed end and a horizontally disposed lower end, for receiving mat segments at said upper end and discharging said mat segments at said lower end;

b) first frame support means arranged adjacent the lower ends of said rods;

c) first releasable clamping means mounted on said first support means to alternately grip and release said lower ends of said rods;

d) second frame support means arranged adjacent the upper ends of said rods;

e) second releasable clamping means mounted on said second support means to alternately release and grip said upper ends of said rods; said first and second releasable clamping means functioning such that at least one end of said rods is always clamped;

f) third frame support means adjacent said first frame support means;

g) lever means pivotatling mounted on said third support means;

h) means to move said lever means between a first and a second operating position;

i) rake means arcuately moveable between adjacent pairs of said curved rod members and mounted at one end of said lever means; and j) flexible coupling means releasably mounted at the lower end of each of said rod members for releasably securing a flexible cable thereto.

2. An apparatus as claimed in claim 1 including hydraulic means to actuate said first and second releasable clamping means.

3. An apparatus as claimed in claim 2 wherein said means to move said lever means is a powered means.

4. An apparatus as claimed in claim 3 wherein said powered means is a hydraulic power means.

5. An apparatus as claimed in claim 4 including means to raise and lower said first and second clamping means into and out of contact with said plurality of rods.

* * * * *